US012694725B2

(12) United States Patent
Todd et al.

(10) Patent No.: US 12,694,725 B2
(45) Date of Patent: Jul. 28, 2026

(54) CONFIGURABLE REAL-TIME FILE OFFLOAD PRIORITIZATION

(71) Applicant: Textron Aviation Inc., Wichita, KS (US)

(72) Inventors: Haines Todd, Derby, KS (US); Adam Blake Wolfe, Bentley, KS (US); Mark Christopher Hansen, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 82 days.

(21) Appl. No.: 18/922,926

(22) Filed: Oct. 22, 2024

(65) Prior Publication Data

US 2025/0140032 A1 May 1, 2025

Related U.S. Application Data

(60) Provisional application No. 63/593,225, filed on Oct. 25, 2023.

(51) Int. Cl.
*G07C 5/00* (2006.01)
*G07C 5/08* (2006.01)
*H04L 67/55* (2022.01)
(52) U.S. Cl.
CPC ........... *G07C 5/008* (2013.01); *G07C 5/0808* (2013.01); *H04L 67/55* (2022.05)
(58) Field of Classification Search
CPC ....... G07C 5/008; G07C 5/0808; H04L 67/55; H04L 67/12
See application file for complete search history.

(56) References Cited

U.S. PATENT DOCUMENTS

| | | | |
|---|---|---|---|
| 8,239,515 B2 | 8/2012 | Chapweske | |
| 9,426,230 B2 | 8/2016 | Anderson | |
| 9,576,404 B2 | 2/2017 | Ziarno et al. | |
| 9,816,897 B2 | 11/2017 | Ziarno | |
| 10,572,330 B2 | 2/2020 | Barr et al. | |
| 11,119,473 B2 | 9/2021 | Cella et al. | |
| 11,659,490 B2 * | 5/2023 | Dondoneau | H04W 4/14 |
| | | | 455/420 |
| 2016/0176538 A1 * | 6/2016 | Bekanich | G08G 5/21 |
| | | | 701/14 |
| 2018/0102964 A1 * | 4/2018 | Kao | H04L 67/568 |

FOREIGN PATENT DOCUMENTS

CA          2808829 C  *  9/2013  ............. G07C 5/008

* cited by examiner

*Primary Examiner* — Brian P Sweeney
(74) *Attorney, Agent, or Firm* — Avek IP, LLC

(57) ABSTRACT

Techniques are disclosed for offloading aircraft data. The aircraft data are received over a network data collection interface associated with an aircraft recording system (ARS). The ARS is adapted to produce aircraft-data messages via a message-broker proxy related to the data received. An associated message is received, and it is determined whether an event has occurred via an event detector process interface. Next, a tag is applied to the event based upon a determination that the event has occurred. The tagged event is then published via the message broker. A published event is received and then recorded to a file via a media recording process interface. It is then determined which data to offload from a recorded event file via a file manager. The associated data is then transmitted via a data offload pathway to a data hub.

20 Claims, 5 Drawing Sheets

400

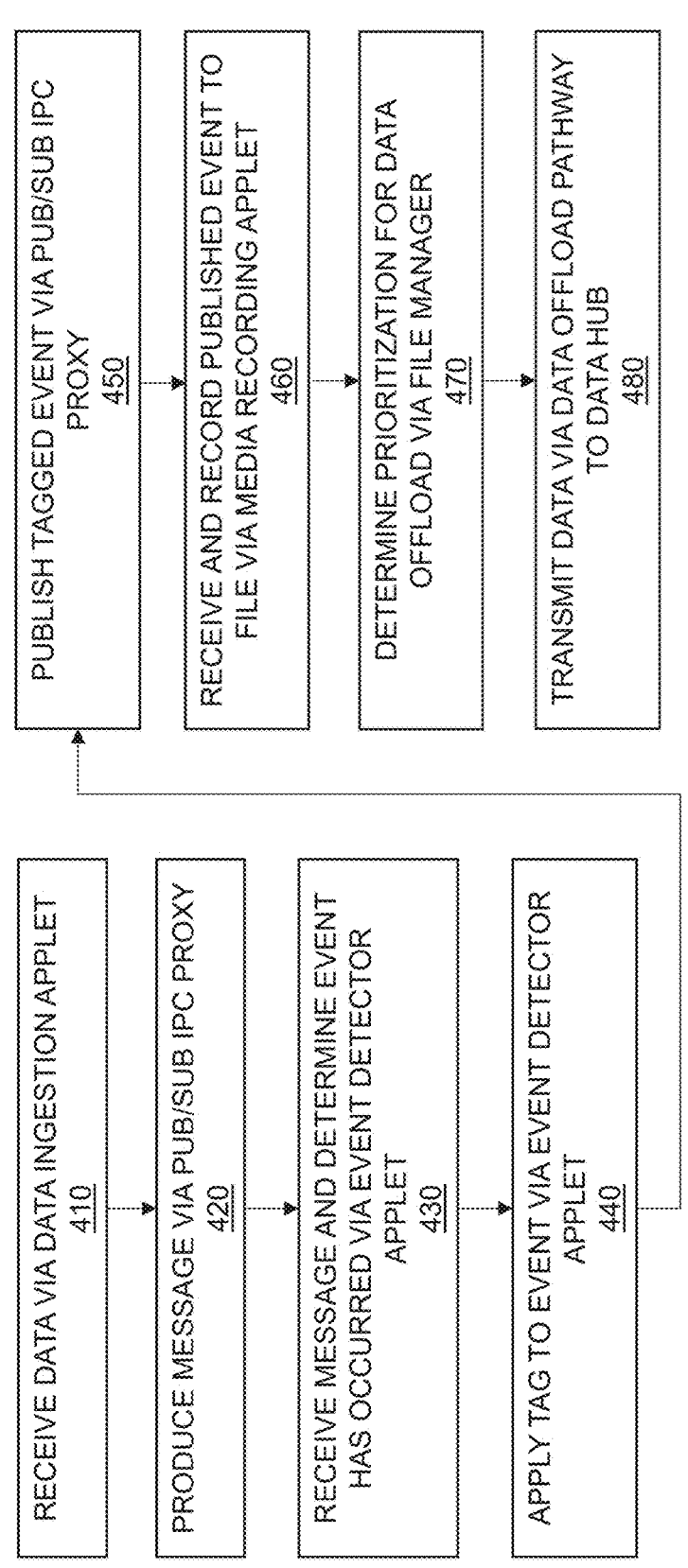

PUBLISH TAGGED EVENT VIA PUB/SUB IPC PROXY
450

RECEIVE AND RECORD PUBLISHED EVENT TO FILE VIA MEDIA RECORDING APPLET
460

DETERMINE PRIORITIZATION FOR DATA OFFLOAD VIA FILE MANAGER
470

TRANSMIT DATA VIA DATA OFFLOAD PATHWAY TO DATA HUB
480

RECEIVE DATA VIA DATA INGESTION APPLET
410

PRODUCE MESSAGE VIA PUB/SUB IPC PROXY
420

RECEIVE MESSAGE AND DETERMINE EVENT HAS OCCURRED VIA EVENT DETECTOR APPLET
430

APPLY TAG TO EVENT VIA EVENT DETECTOR APPLET
440

CONFIGURABLE REAL-TIME FILE OFFLOAD PRIORITIZATION

CROSS-REFERENCE TO RELATED APPLICATIONS

This application claims the benefit of U.S. Provisional Patent Application No. 63/593,225, filed Oct. 25, 2023, the entire contents thereof are herein incorporated by reference.

BACKGROUND

1. Field

Embodiments of the invention relate generally to aircraft data offloading, and more specifically to software and methods for tagging important aircraft data in real time so that such data can be offloaded and/or transmitted on a priority basis.

2. Related Art

Various software and methods for transmitting data are known. U.S. Pat. No. 9,576,404 to Ziarno et al. and U.S. Pat. No. 9,816,897 to Ziarno disclose technologies for transmitting data and for determining what data to transmit. U.S. Pat. No. 8,239,515 to Chapweske discloses systems and methods for transmitting data using different communication channels and a method for deciding what data and when it will be transmitted. U.S. Pat. No. 9,426,230 to Anderson discloses systems and methods for downloading data that involve selecting which files should be downloaded and determining which data transmitting technologies are most cost effective. U.S. Pat. No. 10,572,330 to Barr et al. discloses systems and methods for downloading diagnostic data that includes prioritization of diagnostic files for downloading to reduce the size of the data being downloaded. U.S. Pat. No. 11,119,473 to Cella et al. discloses systems for collecting and processing data that includes data collection and processing modules in the context of a system for interfacing multiple data boards to a central mother board.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In particular, an embodiment includes a method for offloading data associated with an aircraft, the method comprising: receiving, over a network data collection interface, aircraft data via an aircraft-data ingestion process interface of an aircraft recording system (ARS), wherein the ARS comprises a processing unit having a memory for storing software instructions and a processor for executing the instructions, producing a message via a Pub/Sub inter-process communication (IPC) proxy related to the data received, receiving the message and determining whether an event has occurred via an event detector process interface, applying a tag to the event upon a determination that the event has occurred, publishing a tagged event via the Pub/Sub IPC proxy, receiving a published event and recording the published event to file via a media recording process interface, determining what data to offload from a recorded event file via a file manager; and transmitting the data via a data offload pathway to a data hub.

Another embodiment includes an aircraft-data offloading prioritization device for offloading data associated with an aircraft, the aircraft-data offloading prioritization device comprising: an aircraft data collection interface adapted to transmit, over a network data collection interface, aircraft data via an aircraft-data ingestion process interface of an aircraft recording system (ARS), wherein the ARS comprises a processing unit having a memory for storing software instructions and a processor for executing the instructions, an aircraft data transmitter adapted to transmit a message related to the data received, via one or more proxies associated with a message broker, wherein the ARS receives the message and determines whether an event has occurred via an event detector process interface, wherein applying a tag to the event based on the event detector process interface includes determining that the event has occurred to produce a tagged event, and wherein the message broker publishes a new message associated with the tagged event to produce a published event message, and an event receiver adapted to receive the published event message and to record the published event message via a media recording process interface, wherein the ARS identifies tagged aircraft data to offload from a recorded event file via a file manager, and wherein the ARS transmits the tagged aircraft data via a data offload pathway to a data hub.

Yet another embodiment includes non-transitory computer-readable media storing computer-executable instructions that, when executed by a processor, perform a method for data-offloading prioritization for offloading data associated with an aircraft, the method comprising: receiving, over a network data collection interface, aircraft data via an aircraft-data ingestion process interface of an aircraft recording system (ARS), wherein the ARS comprises a processing unit having a memory for storing software instructions and a processor for executing the instructions, producing a message via a Pub/Sub IPC proxy related to the data received, receiving the message and determining whether an event has occurred via an event detector process interface, applying a tag to the event upon a determination that the event has occurred, publishing a tagged event via the Pub/Sub IPC proxy, receiving a published event and recording the published event to file via a media recording process interface, determining what data to offload from a recorded event file via a file manager, and transmitting the data via a data offload pathway to a data hub.

BRIEF DESCRIPTION OF THE DRAWING FIGURES

Embodiments of the invention are described in detail below with reference to the attached drawing figures, wherein:

FIG. 4 depicts an operational flow diagram for configurable real-time file offload prioritization, in an embodiment.

Figure 1:
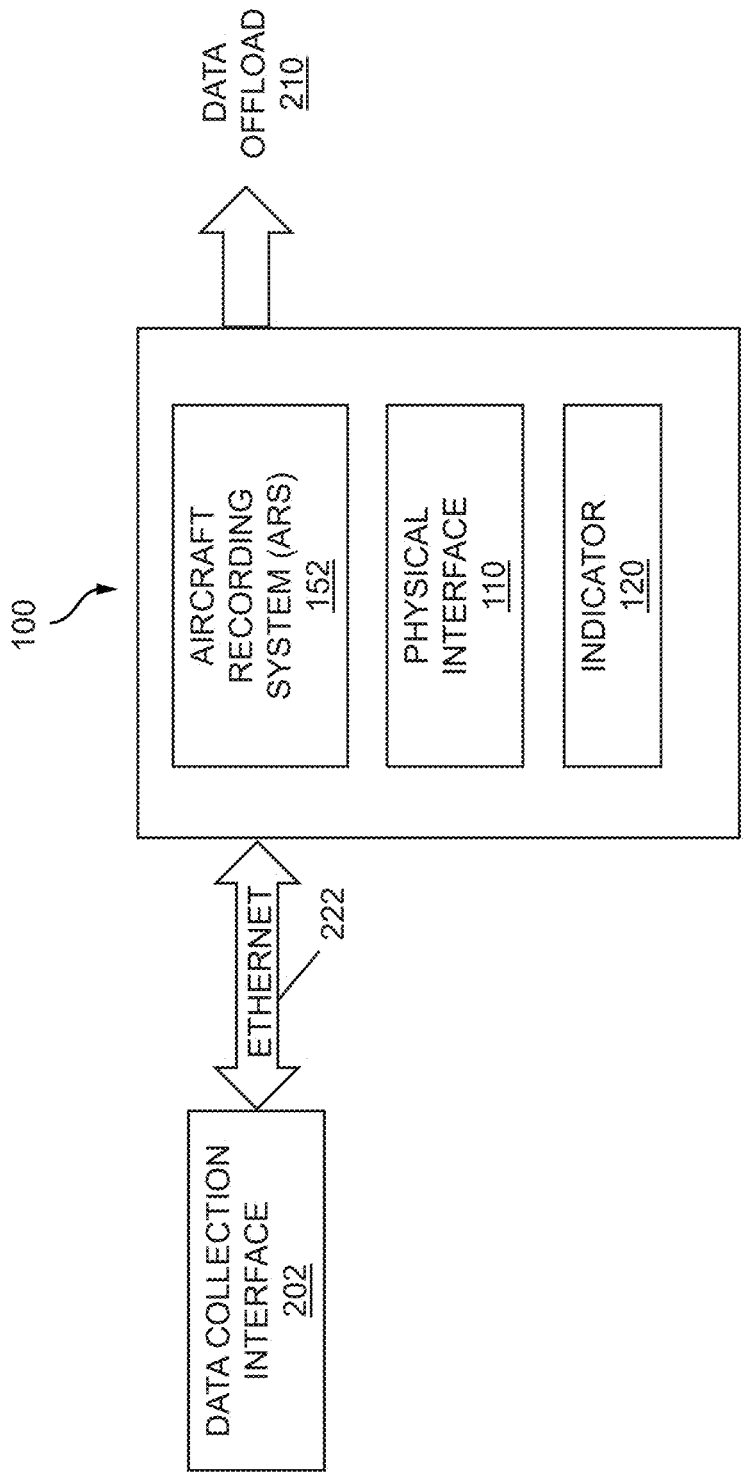
FIG. 1 depicts a block diagram for an aircraft data recording device, in an embodiment.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Aircraft recording system (ARS) devices consistent with the present teachings provide data acquisition and recording mechanisms designed to be installed in one or more aircraft. ARS devices may receive and record data from numerous data buses onboard an aircraft for post-flight retrieval and analysis. Stored data may be retrieved from the device via a variety of structural components and networking processes as further set forth below.

FIG. 1 is a block diagram illustrating an aircraft recording system (ARS) 152 complex 100 having configurable real-time file offload prioritization. As described herein, an ARS complex 100 may comprise an ARS, such as ARS 152 and one or more further ARS-related components. In some such embodiments, ARS complex 100 provides a data acquisition and recording system designed to be installed in aircraft such as commercial and/or general aviation aircraft. Frequently, such an ARS complex 100 would be intended to be permanently installed in an aircraft, however it is understood that a portable ARS complex 100 could be employed as well. In some circumstances, multiple ARS complexes 100 may be installed in an aircraft. ARS complex 100 comprises an aircraft recording system (ARS) 152, a physical interface 110, and an indicator 120, described below.

ARS 152 is configured to receive and record data for retrieval and analysis, such as post-flight retrieval and analysis. ARS 152 comprises a microprocessor unit (MPU) 154 having a non-transitory memory (e.g., a Flash Memory) configured for storing received data and a processor (e.g., a microcontroller) configured for processing computer-readable and computer-executable software instructions (e.g., programs, software applications, or applets) as further described below in connection with FIG. 3. ARS 152 is configured to receive many types of avionics and diagnostics data from multiple sources. For example, ARS 152 may receive and record (or otherwise persist) data from ARINC 429, ARINC 717, controller area network (CAN), and other data buses (e.g., using proprietary protocols), as well as discrete data sources.

As shown in the FIG. 1 embodiment, ARS 152 may receive data from a data collection interface 202 via a network interface, such as ethernet connectivity pathway 222. The ethernet connectivity pathway 222 enables data to be multiplexed from data collection interface 202 without data loss. The data collection interface 202 may comprise one or more data buses that provide data collection and optionally data concentration (e.g., via multiplexing). An aircraft may be equipped with multiple data collection interfaces 202 dispersed in remote locations throughout the aircraft (i.e. remotely located from the cockpit or a centralized computing station onboard the aircraft), which provides shorter wire paths from many input sources (e.g., sensors) leading to an overall reduction in wire weight.

Stored data may be retrieved from ARS 152 via a data offload pathway 210. Data offload pathway 210 may include but is not limited to a removable mass storage module, a wireless interface (e.g., 802.11 WiFi, LTE or GSM cellular connection, wirelessly through the Iridium satellite constellation), or a wired transport mechanism such as universal serial bus (USB), local area network (LAN), Ethernet, etc.

ARS complex 100 consistent with the present teachings may be advantageously used by various types of users. Customer service technicians may use the recorded data to troubleshoot notifications from the field regarding aircraft functionality. Flight data may be analyzed or archived during aircraft manufacture or pre-delivery. Manufacturing personnel may use the system to run functional tests, and engineers may use the data in investigating system anomalies. ARS 152 consistent with the present teachings may employ one or more data collection interface boards, which may be connected by LAN and which may interact with additional hardware and/or software interfaces which may be located onboard an aircraft having one or more transmitters associated with transmitting aircraft data. ARS 152 may be adapted to receive and/or transmit data on multiple types of avionics data buses, such as: ARINC 429, ARINC 717, CAN, and other data buses. Consistent with the present teachings, data of different types may be recorded in a scalable manner and with full native rate sampling and full instrumentation.

The physical interface 110 is for example a physical button or switch disposed on an outer surface of the ARS complex 100. In embodiments, physical interface 110 is a software-configurable push button, which may also be context sensitive for performing different actions depending on the context. Co-pending U.S. patent application Ser. No. 18/887,464, entitled "Aircraft Recording System Interface for Rapid Configuration," and filed Sep. 17, 2024, discloses additional details of physical interface 110 and ARS complex 100 and is herein incorporated by reference in its entirety.

A pilot event button may be provided in embodiments such that a user (e.g., a pilot) may press the pilot event button when a certain event is observed, prompting recently recorded data to be offloaded via offload pathway 210. For example, the pilot event button may be located in the aircraft cockpit and wired to the ARS complex 100 as a discrete input such that the pilot may initiate offloading of data to capture an observed event.

The indicator 120 is for example one or more lamps or lights disposed on an outer surface (e.g., a façade) of the ARS complex 100. In embodiments, each of the one or more lights comprise a light-emitting diode (LED). Different states of the indicator 120 may be used to indicate different states of the ARS complex 100. For example, the indicator 120 may be illuminated when the ARS complex 100 is powered on and the indicator 120 may be off when the ARS complex 100 is powered off. The indicator 120 may flash on and off to indicate different states, and the rate of flashing on/off may be used to indicate different states. For example, a slow flashing may indicate that the power is on and data are actively being recorded; a rapid flashing may indicate that data are being written to a connected device (e.g., a connected USB drive). Other system states of ARS complex 100 may be indicated via indicator 120 without departing from the scope hereof.

Figure 2:
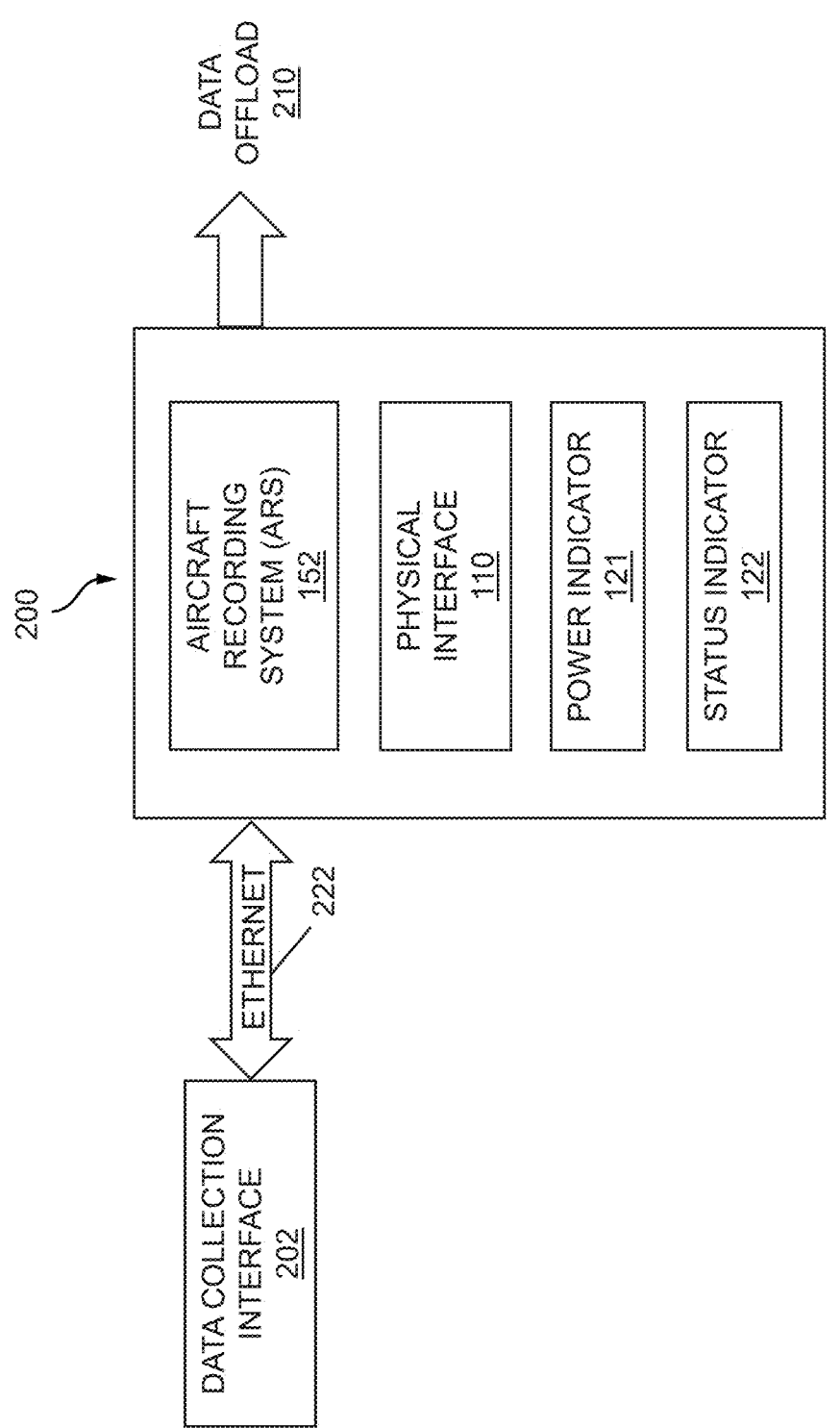
FIG. 2 depicts a block diagram of another embodiment of an aircraft data recording device.

FIG. 2 is a block diagram illustrating an aircraft recording system (ARS) 152 complex 200 having configurable real-time file offload prioritization. ARS complex 200 is an example of ARS complex 100 of FIG. 1. Items enumerated with like numerals are the same or similar and their description may not be repeated accordingly. ARS complex 200 comprises a power indicator 121 and a fault indicator 122 both disposed on an outer surface (e.g., the façade) of the ARS complex 200. Power indicator 121 and fault indicator 122 typically comprise separate and independent lights (e.g., LEDs). Additional details of ARS complex 100 and 200 are described in the incorporated-by-reference and co-pending U.S. patent application Ser. No. 18/887,464, entitled "Aircraft Recording System Interface for Rapid Configuration", and filed Sep. 17, 2024.

Exemplary statuses indicated with power indicator 121 and fault indicator 122 include but are not limited to the following: (i) the power indicator 121 is fully illuminated (e.g., solid on) and the fault indicator 122 is off when the power is on and no faults are detected; (ii) the power indicator 121 is flashing and the fault indicator 122 is off when the power is on and data are being recorded; (iii) both the power and fault indicators 121, 122 are flashing when a fault condition has been detected but the fault condition does not prevent recording of data by the ARS 152; (iv) both the power and fault indicators 121, 122 are fully illuminated (e.g., solid on) when a fault condition has been detected and the fault condition is preventing recording of data by the ARS 152; (v) both the power and fault indicators 121, 122 are off when the ARS complex 200 is powered off; and, (vi) the power indicator 121 is rapidly flashing and the fault indicator 122 is off when data are being written to a USB device via the data offload pathway 210.

In embodiments, data collection interface 202 may include data buses dispersed in remote locations (i.e. remotely located from the cockpit or another centralized computing station within the aircraft), which provides shorter wire paths from many input sources (e.g., LRUs, sensors, etc.) leading to an overall reduction in wire weight. Data received by data collection interface 202 may include any diagnostics output from printed circuit boards (PCBs) on the aircraft (e.g., PCBs for a full-authority digital engine controller (FADEC), spoiler monitor, flap monitor, flap control, weight on wheels, dimming control, etc.). Additional data collection interfaces 202 may be added to the avionics diagnostics network by being communicatively coupled to an existing data collection interface 202 and thereby indirectly coupled to ARS 152. This provides a scalable architecture connectable to an unlimited number of data collection interfaces 202, providing a built-in capability to increase data input sources, as further described in co-pending U.S. patent application Ser. No. 18/783,378, entitled "Parallel Scalable Data Collection," and filed Jul. 24, 2024, which is herein incorporated by reference in its entirety.

Data collection interface 202 may comprise a configurable PCB having a field-programmable gate array (FPGA) communicatively coupled with a microcontroller unit (MCU) via a serial peripheral interface (SPI). A synchronous dynamic random-access memory (SDRAM) is operatively coupled to the MCU to provide instant-on data caching from the MCU prior to the data being transmitted to ARS 152. Data inputs/outputs going to/from the FPGA may include but are not limited to ARINC 429 data inputs, ARINC 429 data outputs, ARINC 717 data input, ARINC 717 data output, and discrete input/outputs. In embodiments, ARS 152 includes a built-in data collection interface (not shown) which is communicatively coupled with one or more external data collection interfaces 202 via ethernet pathway 222.

Data provided to ARS 152 may be in the form of output User Datagram Protocol (UDP) data frames. Commands provided to the MCU comprise input UDP commands. The data may be transmitted between the MCU and ARS 152 over ethernet, such as 100Base-TX for example, which is a 100 Mbit/s baseband signaling fast ethernet connection. Alternatively, a 1 Gbps ethernet link may be used.

Data stored in ARS 152 may be offloaded via data offload pathway 210, which includes but is not limited to a removable mass storage module, a wired or wireless network connection such as a LAN, 802.11 WiFi, LTE or GSM cellular connection, the Iridium satellite constellation, or through a wired transport mechanism such as universal serial bus (USB) for example. In embodiments, ARS 152 includes three SIM card slots with two being for cellular carriers and one for Iridium.

Figure 3:
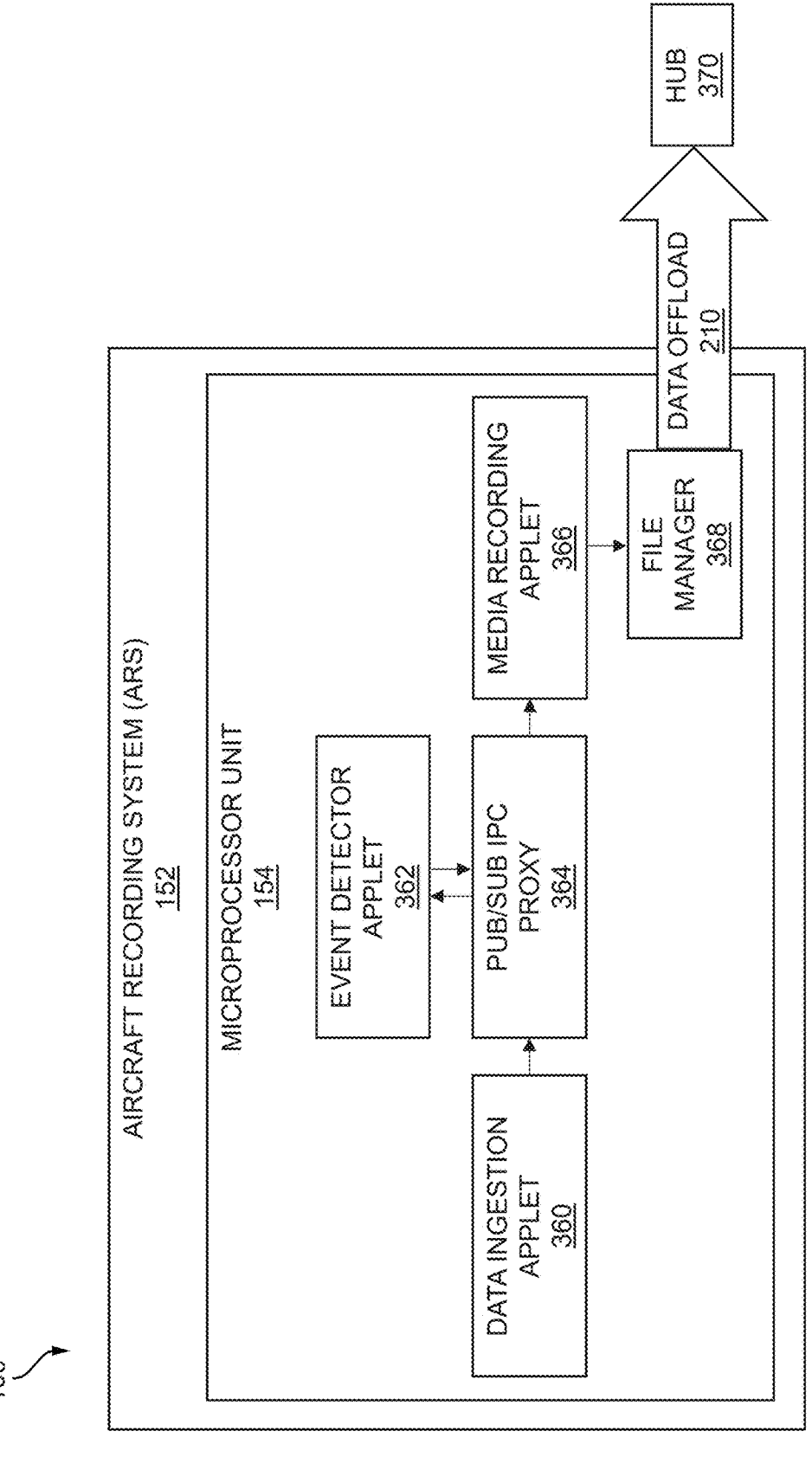
FIG. 3 depicts a flow diagram of a data processing and offloading pathway, in an embodiment.

FIG. 3 is a block diagram depicting exemplary processes running internally within the ARS 152. Specifically, ARS 152 comprises a memory configured for storing software instructions, such as applets, and a processor configured for executing the software instructions. In certain embodiments, ARS 152 comprises MPU 154 that has a quad core arm microprocessor running a custom embedded Linux distribution. In some such embodiments, the MPU 154 also comprises its own random-access memory (RAM).

As depicted in the example of FIG. 3, a data ingestion applet 360, an event detector applet 362, a Publication/Subscriber (Pub/Sub) Inter-process Communication (IPC) proxy 364, a media recording applet 366, and a file manager 368 each comprise a configurable real-time process stored in and executed by the MPU 154. The processes are each run as a service on a Linux operating system. In some embodiments, the example Publication/Subscriber (Pub/Sub) Inter-process Communication (IPC) proxy 364 may be implemented in connection with any pub/sub message broker such as Kafka or rabbitmq.

The data ingestion applet 360 receives data in ethernet packets via ethernet connectivity pathway 222. The data are parsed and formatted by the data ingestion applet 360, then sent to the Pub/Sub IPC proxy 364. The Pub/Sub IPC proxy 364 allows any applet to subscribe to a piece of data. In this manner, any applet interested in some piece of data can subscribe and will receive a message related to that piece of data if subscribed. Applets can be configured to subscribe to any topic. An envelope may be implemented as a string of numbers and periods used to tag a particular piece of data, which enables an applet to subscribe to a detailed piece of data (e.g., data from a particular sensor).

The media recording applet 366 may be configured to subscribe to messages about all available aircraft data, nevertheless some data may be more important than others. Important information is detected with a state machine (e.g., logging flags and time stamps), which is embodied as the event detector applet 362 in the FIG. 3 embodiment as further described below. The event detector applet 362 comprises a generically defined state machine configured to publish events. The published events get picked up by media recording applet 366. The event detector applet 362 applies tags to the recorded data (e.g., aircraft was flying). The event detector applet 362 subscribes to certain topics, runs inputs through the state machine, and if a certain sequence of events occurs as specified in a configuration file, a message is published.

Figure 5:
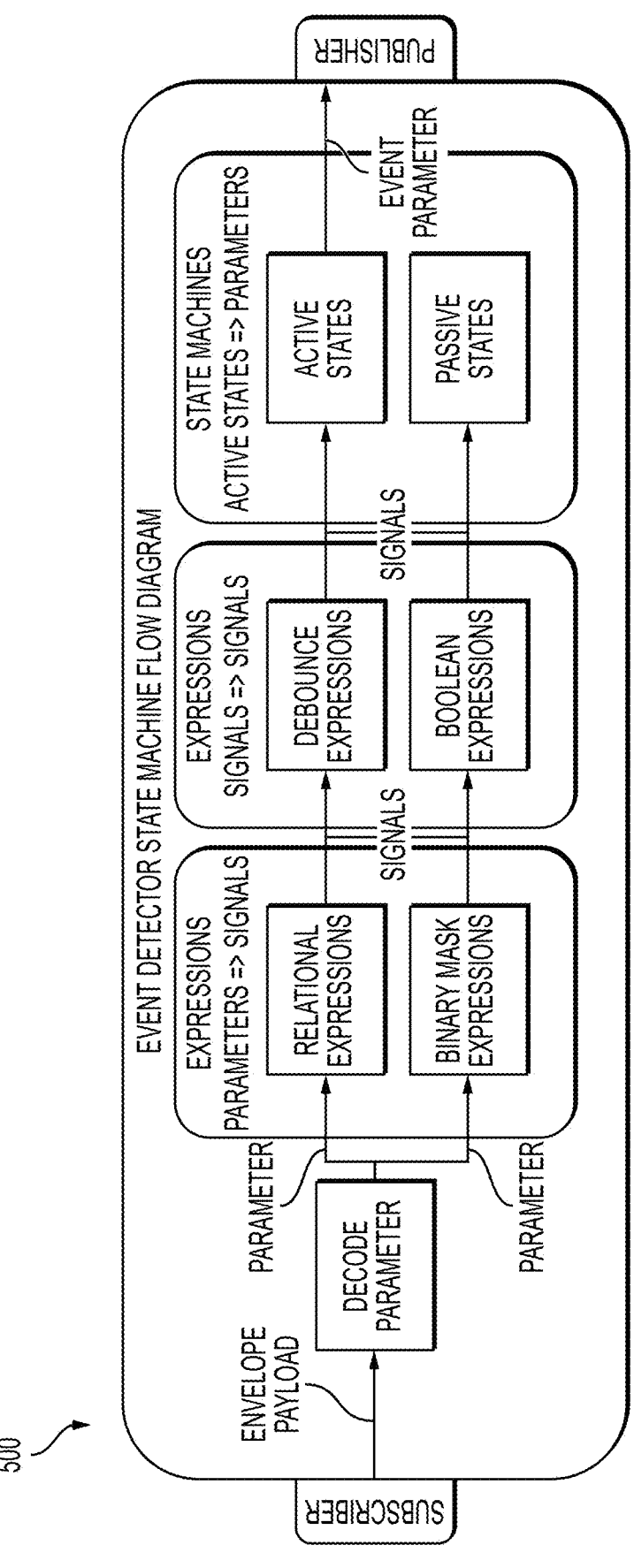
FIG. 5 is an exemplary state machine flow diagram for an event detector process, in an embodiment.

An exemplary state machine flow diagram 500 for event detector applet 362 is shown in FIG. 5. Data first flows into the event detector via the subscriber socket. Once an envelope and its corresponding payload is received, a lookup is performed to determine what parameters that envelope feeds in a manner which is a one-to-many mapping (e.g., one envelope may decode to multiple parameters). Once the parameters are decoded their updated values are fed into one of two types of expressions. Which type it feeds depends on the parameters type, integer or byte array. If the parameter's type is an integer, it may feed a relational expression in which it is compared to the value of another parameter or a constant value with a greater than, less than, or equals operator. If the parameter's type is a byte array, it may be fed into a binary mask expression where certain bits are checked whether or not they are asserted. The output of both relational and binary mask expressions are a "signal" which evaluates to true or false. A signal may feed a Boolean expression or a debounce expression. A Boolean expression is used to perform Boolean logic on one or more signals using the operators NOT, AND, OR, NOR, NAND, and XOR. Debounce expressions are used to generate the debounced version of a signal, such that any glitches in the input data can be filtered out. Finally signals feed the inputs to state machines. A state machine is composed of one or more states where each state may be triggered to move to another state by any of the signals previously defined. States may be defined to be passive or active. Passive states will generate no outputs; whereas active states generate outputs by publishing an event message that includes a unique parameter used to identity that state, as well as the time of the event and other helpful contextual information surrounding the event.

The file manager 368 comprises offload policies used to prioritize which data to send especially if the data offload pathway 210 is bandwidth limited. In embodiments, the file manager 368 prioritizes data based on the tags and bandwidth availability. The file manager 368 is configurable depending on the configuration file which may be received upon a most recent connection to the internet. Decisions relating to which data to offload first are needed when more than one option for downloading data are available. By simply updating the configuration file, the prioritization upon which the file manager 368 operates is configurable. In some embodiments, the file upload policies are provided as configuration files via the digital device twin for the file manager 368 upon connection to the internet.

Data transmitted via data offload pathway 210 are received by a data hub 370. Data hub 370 may include any back end generic resting place for the data. For example, the data hub 370 may comprise a server, cloud storage, or Internet-of-Things (IoT) data storage platform. In some embodiments, the data hub 370 is a Microsoft Azure IoT hub. Once a data pathway is established, configurable policies are readable via the Data hub 370. Users may then access data via data hub 370 in various ways (e.g., via an internet connection). In embodiments, a device twin operates in a cloud-based server. The device twin may be used by a user to see what data sets are available onboard the ARS complex 100/200.

FIG. 4 is an operational flow diagram for an exemplary data-offloading prioritization method 400. ARS 152 may be configured to perform method 400 onboard an aircraft. Data are received via data collection interface 202, processed via ARS 152, and data are offloaded on a priority basis to data hub 370 via one of the data offload pathways 210.

In step 410, data are received via ARS 152. In an example of step 410, the data ingestion applet 360 receives data in ethernet packets via ethernet connectivity pathway 222; the data are parsed and formatted by the data ingestion applet 360 and sent to the Pub/Sub IPC proxy 364.

In step 420, a message is produced for an event. In an example of step 420, a message is produced via the Pub/Sub IPC proxy 364 (e.g., for a topic that has been subscribed to, a message is produced for data received that falls within that topic).

In step 430, the message is received and an event is determined to have occurred. In an example of step 430, event detector applet 362 receives the message and determines whether an event has occurred based on the subscriptions of the Pub/Sub IPC proxy 364.

In step 440, a tag is applied to the event. In an example of step 440, a tag is applied via event detector applet 362 to the event identified in step 430.

In step 450, the tagged event is published. In an example of step 450, the tagged event is identified and published by the Pub/Sub IPC proxy 364 to provide a published event.

In step 460, the published event is recorded to file. In an example of step 460, the published event is received and recorded to file via media recording applet 366 to provide a recorded event file. The recorded event file may include a meta data file in embodiments.

In step 470, prioritization for data offload is determined. In an example of step 470, the file manager 368 receives the recorded event file and determines what data to offload based on offload policies established to provide prioritization in view of various considerations (e.g., what offload pathways are available, speed of available offload pathway, cost of available offload pathway, importance of event detected, etc.). The offload policies may be stored in memory of ARS 152.

In step 480, data are offloaded. In an example of step 480, data are transmitted to data hub 370 via one of the offload pathways 210 as determined in step 470.

In an operational example of method 400, if a discrete data signal goes from low to high and stays high for a predetermined duration (e.g., six seconds), the high signal status is received by the data ingestion applet 360, the Pub/Sub IPC proxy 364 allows the event detector applet 362 to receive a message related to the discrete signal being high, the event detector applet 362 determines the high discrete signal to be an event and applies a tag, the Pub/Sub IPC proxy 364 picks up the tagged event and publishes it, and the published event is picked up by the media recording applet 366. The media recording applet 366 records the event to file, including a metadata file. The file manager 368 picks up the recorded event file and decides what to offload based on the offload policies and bandwidth availability of the offload pathways 210, and the data are offloaded to the data hub 370.

In an example use of method 400, a user may want to track a certain event. Certain events may be deemed important enough to prioritize for offloading even if the only available offload pathway is a more expensive or slower option (e.g., cellular may be expensive, Iridium is expensive and slower). If a certain event is observed, it may be immediately offloaded over the Iridium pathway (e.g., maybe only a few MB of data). Time-critical and therefore urgent, or otherwise important data may be offloaded by way of expensive pathways, whereas less critical data may not be offloaded until after a flight is completed and a less expensive option is available (e.g., WiFi at a hanger). Time-critical attributes may include, for example, safety-related attributes associated with aircraft sensor data. With Pub/Sub IPC proxy 364, a user may subscribe to only a proxy (e.g., only a subset of interesting data), to provide a more granular data stream. Files with certain tags may be offloaded (e.g., via cellular pathway), and portions of a data file may be offloaded (e.g., only the most important 500 MB).

ARS 152 consistent with the present teachings may receive diagnostics data from microcontroller unit (MCU)-based line-replaceable units (LRUs) via an RS-485 interface. ARS 152 consistent with the present teachings may be capable of receiving either 480 kHz or 375 kHz speed connections depending on software configuration. Moreover, ARS 152 consistent with the present teachings may implement a soft-shutdown feature, a Battery Operation mode, and/or a Low Power mode. The low power mode may power down some wireless interfaces of one or more ARS 152 in some embodiments. In a Normal Operation mode, programmable devices have completed bootup and ARS 152 has started recording data. In Battery Operation mode, ARS 152 may be interfaced with programmable devices that may remain powered on while recording sensor data. ARS 152 may offload recorded data if a viable path to the internet exists. Upon entering Battery Operation Mode, a timer may begin incrementing and ARS 152 may turn itself off once the timer reaches a software configurable threshold or the Battery Bus Voltage drops below a predetermined voltage (e.g., about 21 VDC to about 25 VDC).

As used herein, an ARS application (or aircraft-data process interface) refers to any thread or process which communicates with other ARS applications using the guidelines described here. Not all threads and processes living in a particular ARS implementation may be designated as an ARS application. Moreover, not all ARS applications are part of an ARS implementation. External test hardware or another LRU communicating with one or more ARS may also be designated an ARS application. From the perspective of an application layer, ARS messages may be atomic. In some embodiments, a receiving application may either receive an entire message without error or it may receive no message at all. Messages may be separated into different logical parts (such as a header and payload). Each part of a message may be referred to as a frame. For each message pattern, the number of frames making up a message may be known by the sending and receiving applications beforehand. A message pattern generally defines a general flow of messages between nodes in a network. A pattern does not specify the format of the message contents. Message formats are described for various patterns in terms of several parameters. The first parameter relates to which party initiates communication. A further parameter relates to whether a response is expected. Next, it may be determined whether delivery should be guaranteed or whether communications are established based on communicating between one to one, one-to-many, many to one, or many to many. Also, of consideration is whether a receiver has information regarding an identity of the sender(s) and whether a sender has information regarding an identity of the receiver(s).

ARS applications may use two message patterns to communicate with other applications: publisher/subscriber and request/response. An application may implement one or all of these depending on its role. Such message patterns include publisher/subscriber and request/response. Publisher/Subscriber may be considered a one to many, asynchronous pattern, under which a publishing application asynchronously sends out messages and any interested application may subscribe to that publisher. Such a publisher/subscriber pattern may have the following features. First, a publisher need not know whether its messages are being received. A subscriber may fail to receive any messages the publisher sent before the subscriber subscribed. If a publisher sends messages faster than a particular communication medium can transmit messages, messages may be dropped. If a subscriber cannot keep up with the publisher's feed, messages may be dropped.

By contrast, request/response may be considered a one-to-one, synchronous message transmission pattern, in which a requesting application is considered a client and a responding application is a server. A request/response pattern may exhibit the following features. A requester initiates communication, expecting a single response from a specific responder for each request. The requester typically awaits a response prior to sending further requests. The responder must respond with a generic negative acknowledgment if it is unable to handle a request. The requester is responsible for parsing the response to determine if its request could be handled.

ARS message formats, consistent with the present teachings, are designed to facilitate bandwidth efficient inter-application communication while also minimizing the complexity of encoder/decoder functions. Messages sent by publishers may contain two frames, an envelope and a payload. The envelope may be formatted such that the publisher and corresponding payload are uniquely identified by the envelope. Subscribers may be capable of filtering out messages they are not interested in using the envelope. Each envelope uniquely identifies a node in a tree corresponding to at most one message. The envelope is represented in human readable form as a string of non-negative integers, separated by periods.

Each envelope may have one and only one payload type associated with it. However, multiple envelopes may re-use the same payload type. The publishing application may be responsible for maintaining the payload types associated with each of its envelopes and providing subscribers with a means to determine the payload type at build time. A pub/sub message payload may contain no more than 1024 bytes. Most pub/sub message payloads should contain less than 32 bytes.

The command in a request/response message is a string indicating how the payload should be handled by the recipient. The string should be short but descriptive enough to indicate the action taken in the request/response message. The maximum length of a command string may be 32 characters. A few examples of command strings for request/response messages are shown in FIG. 4 below. This list is not exhaustive, and it is ultimately up to the requesting and responding applications to determine what commands they may implement. The only required command is the NACK. All responding applications may send a NACK in response to an unknown command. All requesting applications may be capable of receiving and parsing a NACK.

In some embodiments, a pub/sub proxy serves as a bridge between publishers and subscribers that reside within ARS 152 consistent with the present teachings. All publishing applications running in the ARS 152 may publish to the pub/sub proxy. All subscribing applications may subscribe to the pub/sub proxy. This allows publishers and subscribers to be dynamically added without affecting other applications. The pub/sub proxy may blindly forward messages from publisher(s) to subscriber(s). The pub/sub proxy may run as a service and automatically restart if it ever crashes.

In some embodiments, the media recording applet 366 or event detector process interface may be a primary subscriber of data ingestion applet 360. The recording applet may subscribe to the base envelope of the pub/sub proxy and store all messages received to non-volatile media. A re-publisher is a more complex variant of the pub/sub proxy that connects to applications outside of the LRU via bandwidth limited interfaces. The re-publisher may subscribe to the pub/sub proxy and publish to a network interface on a known port. The re-publisher may support a request-response service that allows subscribers to limit the rate at which messages are published. The re-publisher's request response service may support the following commands. The re-publisher may reply to each command with an ACK if the request could be handled and a NACK if the request could not be handled or is unrecognized. ACK and NACK payloads may be filled with descriptive strings carrying human readable warnings, errors, or other relevant debug information.

Req/Rep type messages may arrive from multiple clients on any network interface. Each request needs to be routed to the application responsible for handling the request and sending a response. The distributor reads the Command String from each request and forwards it to the responsible application. The distributor may run as a service and automatically restart if it ever crashes. The distributor may forward requests to the application responsible for handling the request. The distributor may forward responses back to the original requester. The distributor may respond with a NACK if it is unable to determine which application to route the request to. The distributor may be capable of handling requests from multiple clients at once (1 request per client)

The distributor's routing tables may be configurable at runtime. Responding applications may be capable of indicating the request command they can handle. The distributor may have a default routing table. The distributor's config files may be implemented as JavaScript Object Notation (JSON) format files having a file extension "json." The distributor may forward the identity of the requesting client to the responsible application. Upon startup, the Distributer service reads in one or more configuration files to determine its routing table. A configuration file contains one or more entries. An entry contains the following information fields: (i) the name of the application the entry belongs to; (ii) the network endpoint of the application's response service is bound to; (iii) the priority of the entry; and (iv) a list of commands the application implements and their respective priorities.

The distributor service has a default config file that sets an endpoint for every application and assigns every (known) command to an application. However, applications may install additional config files that override the default config file. The following information may be overridden by additional config files. The network endpoint used by a given application may be overridden. Commands assigned to other applications may be reassigned to another application. New commands not defined in the default config file may be created.

The Cellular Manager application is responsible for starting up/shutting down the cellular interface. The Cellular Manager's goal is to abstract away the low-level AT and driver commands needed to control the cellular module. The Cellular Manager may run as a service and automatically restart if it crashes. The service may be capable of initializing the cellular modem's data connection. The service may be capable of de-initializing the cellular modem's data connection. The service may be capable of safely rebooting the cellular modem upon command. The service may be capable of safely shutting down the cellular modem upon command. The service may set the fast shutdown GPIO trigger upon first start up. The GPIO fast shutdown trigger may be configurable via the response service. The Default SIM card used may be configurable via config file. The Default Firmware used by the cellular module may be configurable via config file.

The driver used by the cellular modem in ARS 152 consistent with the present teachings is sensitive to address resolution protocol (ARP) table changes caused by other network interfaces. Having other network interfaces up at the same time as the cellular interface can cause random disconnects. To mitigate this issue, the Cellular Manager moves the cellular interface to its own network namespace. An ARS network manager may automatically configure available network interfaces via config file. The ARS network manager may run as a service and automatically restart if it ever crashes. Interfaces managed by the ARS network manager should be fully configurable. The ARS network manager may retrieve its configuration from the ARS executive upon startup. The ARS network manager may notify the ARS executive of any runtime errors it encounters using an error command. In some embodiments, an associated file manager makes use of a cloud based digital device twin, which may be implemented as a json dictionary connected to a single aircraft identity whose properties are summarized as described below. A device twin contains desired properties and reported properties. ARS 152 consistent with the present teachings may write to reported properties, but only has read access to the desired properties. Similarly, a cloud-based IoT Hub may write to the desired properties but only possesses read access to the reported properties. Whenever an ARS 152 consistent with the present teachings connects to the Internet, it may synchronize its device twin, so that both it and the cloud-based IoT Hub may have access to the most up-to-date desired and reported properties.

The reported properties contain a dictionary of datasets currently stored on ARS 152 consistent with the present teachings. Each dataset entry contains a dictionary of data files contained in the dataset. Each data file entry contains meta-data associated with that data file. This meta data includes upload status, file extensions, and any other key-value pair that is associated with that data file. Device twin desired properties may contain a dictionary of upload policies which specify what network interfaces may be used to upload a given data file. Each upload policy consists of an interface name, a policy type, name policy parameters, and tag policy parameters. A data file is said to "match" a policy if that policy determines that it should be uploaded over a given interface. A policy can filter datasets by name and/or tags. Whenever an ARS 152 consistent with the present teachings connects to the internet and finishes synchronizing its device twin, it may iterate over all currently pending datasets and may begin uploading datasets that match one or more policies.

In some embodiments, the cloud-based Streamer's communication with the cloud-based IoT Hub deviates from the standard pub/sub, req/rep patterns. This makes parameter streaming more configurable and asynchronous. The cloud-based Streamer makes use of Microsoft cloud-based's Module Device Twin, a json dictionary connected to a single aircraft identity whose properties are described below. Whenever an ARS 152 consistent with the present teachings connects to the internet, it may synchronize its Module Twin, so that both it and the IoT Hub may have access to the most up-to-date desired and reported properties. The reported properties contain a dictionary of the most recent parameter values ARS 152 consistent with the present teachings was configured to stream. Each entry's key is the envelope for a parameter and the value is the parameter payload converted to a hex string. The Module Twin desired properties contains two dictionaries that determine which parameters may be streamed and the rate at which they may be streamed. These dictionaries are named "stream_policies" and "stream_sessions" respectively. Each entry in a stream policy or stream session consists of an interface name, a pooling rate, and a dictionary of parameters to stream. Stream policies define a baseline set of parameters to always stream when an ARS is connected over a given interface. If the interface specified in a stream policy is the current path to the Internet, then the parameters specified in that policy may be streamed to the IoT Hub at that policy's pooling rate and all other stream policies may be ignored. Stream sessions are used to set additional parameters that may be temporarily streamed before returning to the baseline. Unlike stream policies, more than one stream session may be active at once. If a stream session is not renewed within a configured number of seconds, the cloud-based Streamer may stop streaming its parameters.

In some embodiments, aircraft flight data monitoring (FDM) systems and services may be provided for aircraft by way of one or more ARS 152. In some embodiments ARS 152 may be provided in the context of a data reporting ecosystem. Users of ARS 152 may elect to transfer flight data to one of various user-selected flight operational quality assurance (FOQA) providers, which may include (Flight Data Services L3Harris Technologies' Flight Data Connect service or Safran Electronics & Defense's Cassiopée Flight Data Monitoring solution). ARS 152 users may receive support via ARS vendors, through a global network of service and part centers, mobile service units and 24/7 support.

Such FDM programs facilitate the ability for users to improve operational efficiency, training, and reliability by transferring flight data to customer-selected data management providers, allowing users to select a service provider that best fits their needs, ensuring they receive the most comprehensive flight data monitoring capabilities for their aircraft. Wireless transfer of data to the provider of choice requires no additional equipment, making it a simple and seamless process. Systems consistent with the present teachings provide fault notification and diagnostics enable downtime reduction, returning the aircraft to service faster than ever.

Although the invention has been described with reference to the embodiments illustrated in the attached drawing figures, it is noted that equivalents may be employed and substitutions made herein without departing from the scope of the invention as recited in the claims.

The invention claimed is:

1. A data-offloading prioritization method for offloading data associated with an aircraft, the method comprising:

receiving, over a network data collection interface, aircraft data via an aircraft-data ingestion process interface of an aircraft recording system (ARS), wherein the ARS comprises a processing unit having a memory for storing software instructions and a processor for executing the instructions;

producing a message via a Pub/Sub inter-process communication (IPC) proxy related to the data received;

receiving the message and determining whether an event has occurred via an event detector process interface;

applying a tag to the event upon a determination that the event has occurred;

publishing a tagged event via the Pub/Sub IPC proxy;

receiving a published event and recording the published event to file via a media recording process interface;

determining what data to offload from a recorded event file via a file manager; and transmitting the data via a data offload pathway to a data hub.

2. The data offloading prioritization method of claim 1, wherein the event detector process interface is an event detector applet.

3. The data offloading prioritization method of claim 1, wherein the media recording process interface is a media recorder applet.

4. The data offloading prioritization method of claim 1, wherein the network data collection interface comprises a wireless network interface.

5. The data offloading prioritization method of claim 1, wherein the network data collection interface comprises a wired network interface.

6. The data offloading prioritization method of claim 5, wherein the wired network interface is an Ethernet interface.

7. The data offloading prioritization method of claim 1, wherein the data offload pathway is a data-offload wireless network interface.

8. An aircraft-data offloading prioritization device for offloading data associated with an aircraft, the aircraft-data offloading prioritization device comprising:

an aircraft data collection interface adapted to transmit, over a network data collection interface, aircraft data via an aircraft-data ingestion process interface of an aircraft recording system (ARS), wherein the ARS comprises a processing unit having a memory for storing software instructions and a processor for executing the instructions;

an aircraft data transmitter adapted to transmit a message related to the data received, via one or more proxies associated with a message broker, wherein the ARS receives the message and determines whether an event has occurred via an event detector process interface, wherein applying a tag to the event based on the event detector process interface includes determining that the event has occurred to produce a tagged event, and wherein the message broker publishes a new message associated with the tagged event to produce a published event message; and an event receiver adapted to receive the published event message and to record the published event message via a media recording process interface, wherein the ARS identifies tagged aircraft data to offload from a recorded event file via a file manager, and

15 wherein the ARS transmits the tagged aircraft data via a data offload pathway to a data hub.

9. The aircraft-data offloading prioritization device of claim 8, wherein the event detector process interface is an event detector applet.

10. The aircraft-data offloading prioritization device of claim 8, wherein the message broker comprises a Pub/Sub inter-process communication (IPC) proxy.

11. The aircraft-data offloading prioritization device of claim 8, wherein the aircraft-data ingestion process interface comprises a data ingestion applet.

12. The aircraft-data offloading prioritization device of claim 8, wherein the media recording process interface comprises a media recording applet.

13. The aircraft-data offloading prioritization device of claim 8, wherein the data offload pathway comprises a wireless network.

14. The aircraft-data offloading prioritization device of claim 8, wherein the data offload pathway comprises a wired network.

15. One or more non-transitory computer-readable media storing computer-executable instructions that, when executed by a processor, perform a method for data-offloading prioritization for offloading data associated with an aircraft, the method comprising:

receiving, over a network data collection interface, aircraft data via an aircraft-data ingestion process interface of an aircraft recording system (ARS), wherein the ARS comprises a processing unit having a memory for storing software instructions and a processor for executing the instructions;

producing a message via a Pub/Sub IPC proxy related to the data received;

16 receiving the message and determining whether an event has occurred via an event detector process interface;

applying a tag to the event upon a determination that the event has occurred;

publishing a tagged event via the Pub/Sub IPC proxy;

receiving a published event and recording the published event to file via a media recording process interface;

determining what data to offload from a recorded event file via a file manager; and transmitting the data via a data offload pathway to a data hub.

16. The non-transitory computer-readable media of claim 15, wherein the ARS is a component of an ARS complex, the ARS complex further comprising a physical interface, a power indicator, and a status indicator.

17. The non-transitory computer-readable media of claim 15, wherein the tag is applied to one or more prioritized aircraft events, wherein the one or more prioritized aircraft events are prioritized based on a time-critical attribute associated with the one or more prioritized aircraft events.

18. The non-transitory computer-readable media of claim 15, wherein recording the published event to file via a media recording process interface comprises persisting metadata associated with the published event to one or more non-volatile memories associated with the ARS.

19. The non-transitory computer-readable media of claim 18, wherein the media recording process interface is a media recording applet.

20. The non-transitory computer-readable media of claim 15, wherein the data hub comprises one or more of: a server, cloud storage, or an Internet-of-Things (IoT) platform.

* * * * *